Feb. 17, 1942.  W. E. McCULLOCH  2,273,413

UNDERINFLATED TIRE WARNING DEVICE

Filed Dec. 29, 1939

INVENTOR.
WILLIAM E. McCULLOCH
BY M. Talbert Dick
ATTORNEY.

Patented Feb. 17, 1942

2,273,413

UNITED STATES PATENT OFFICE 2,273,413

UNDERINFLATED TIRE WARNING DEVICE

William E. McCulloch, Des Moines, Iowa

Application December 29, 1939, Serial No. 311,581

2 Claims. (Cl. 116—34)

The principal object of my invention is to provide a device for automotive vehicles such as automobiles, busses, trucks and like that will audibly warn the operator of the vehicle when his pneumatic tire or tires are low, deflated or underinflated.

A further object of this invention is to provide an under-inflated tire warning device that may be quickly and easily installed without marring or damaging the vehicle in any way and without the services of a skilled mechanic.

More specifically, the object of this invention is to provide a small inexpensive low tire warning device that is capable of being attached to the rim of the vehicle upon which the pneumatic tire is placed.

A still further object of my invention is to provide an under-inflated tire warning device that is simple in operation, economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 1:
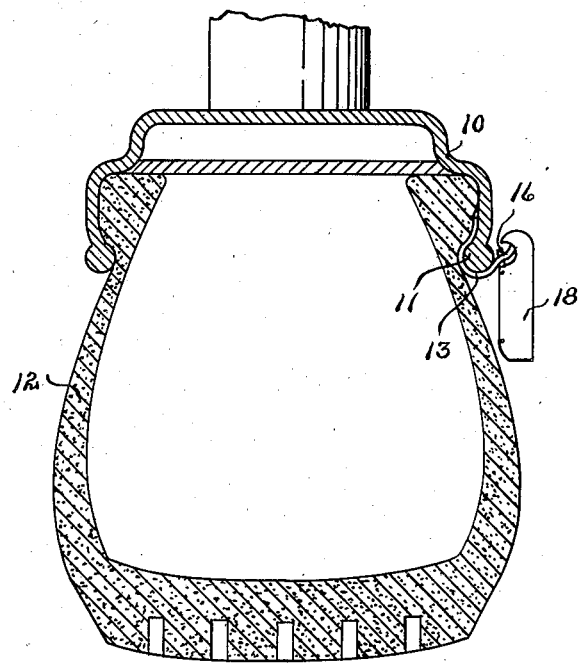
Fig. 1 is a cross-sectional view of a wheel showing my warning device attached thereto.

Operating a motor vehicle with a low tire or tires is not only dangerous to life and property from an accident standpoint, but the tire casing is sure to be damaged if not completely ruined. Various types of devices have been created to warn the operator of a vehicle that his tires are low, but in most instances, such devices are very complicated, difficult to install and dependent upon either electricity or the remaining low pressure in the tire as the motive power for operating the warning phase of the installation. I have overcome such objections as will hereinafter be appreciated.

Referring to the drawing, I have used the numeral 10 to designate the ordinary metallic rim of a wheel having the usual rim bead 11. The numeral 12 designates a pneumatic tire on the rim 10. It is to such a wheel that I install my device and which I will now describe in detail.

Figure 2:
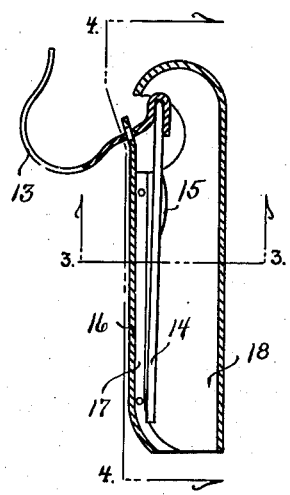
Fig. 2 is an enlarged longitudinal sectional view of the device and more fully illustrates its construction.

I have used the numeral 13 to designate a clamp element designed to embrace the bead 11. This clamp 13 may be made of any suitable design, and although in the drawing I show that it snaps into place on the bead 11 and extends between the rim and casing, it may, however, be secured to the wheel rim by any suitable means such as by bolts, screws, welding, or like. The numeral 14 designates an elongated leaf spring member having one of its ends secured by any suitable means to the outer free end portion of the member 13 as shown in Fig. 2. This spring member 14 is rigidly secured to the member 13 and extends radially from the wheel and along the side of the casing 12. The numeral 15 designates a depression formed in the length of the leaf spring 14 and when the free end of the spring 14 is flexed inwardly or outwardly relative to the casing 12, the spring will click or make a breaking sound if it flexes past center in either direction.

Figure 3:
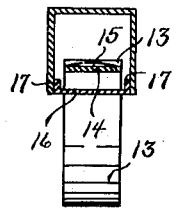
Fig. 3 is a cross-sectional view of my under-inflated tire warning device and is taken on line 3—3 of Fig. 2.
Figure 4:
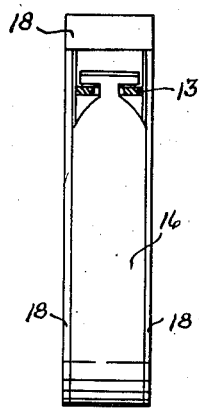
Fig. 4 is a longitudinal sectional view of the device taken on line 4—4 of Fig. 2.

Such noise making springs are old in the art of noise makers and are usually called clackers. As is well known, when the outer end of the spring 14 is moved in one direction and its other end held rigid, it clicks as it goes past center in one direction and then clicks a second time when it returns to normal position by its own spring resiliency. By this construction when it is mechanically forced to flex in one direction, it makes a clicking sound and when it returns to normal position, due to its own resiliency, it clicks a second time. The numeral 16 designates a tongue member having its upper end hinged to the member 13 and resting between the casing 12 and the leaf spring 14, as shown in Fig. 2. This member 16 extends radially adjacent the side wall of the tire and the leaf spring 14. The outer end of the member 16 extends radially and outwardly in a curved path and has outwardly extending flanges 17 at its two side edges as shown in Fig. 3. The numeral 18 designates a sound box or housing snapped onto the flanges 17 as shown in Fig. 3. The housing 18 may be secured to the member 16 by any suitable means and loosely embraces the spring 14 as shown in Fig. 2. The outer end of the housing 18 is open.

The practical operation of my device is as follows: After the device has been installed to a wheel as shown in Fig. 1, the member 16 will rest adjacent the side wall of the casing and as long as the casing is properly inflated, the casing will not contact and move the member 16. However, if the casing becomes under-inflated, due to lack of air pressure in its inner tube (not shown in the drawing), the casing will spread out to the side on the roadway or supporting surface under the tire. Because of this, each time the wheel makes one revolution, my warning device will be at the bottom of the wheel and as the casing spreads out, due to lack of proper pressure, it will engage the member 16, thereby forcing it outwardly.

In turn the member 16 will engage the outer end portion of the spring 14 and move it outwardly, causing the same to produce a clicking sound. With the further rotation of the wheel, my device will move around with the wheel, at which time the casing at this point will return to a substantially normal condition, thereby permitting the member 16 to be moved by the action of the spring to a normal position as shown in Fig. 1 and at this moment, the device will make its second clicking sound. By this arrangement of parts, it is obvious that each time the wheel makes one revolution, my device will make two clicking sounds which will be amplified by the member 16 and housing 18 surrounding the clicking leaf spring. This sound can easily be heard by the operator of the vehicle and he will then know the tire is either down or seriously underinflated. By making the lower end of the member 16 curved, there is no danger of the device gouging or injuring the casing.

From the foregoing, it will readily be seen that I have provided a simple, easily installed, and efficient device for warning of the existence of an under-inflated tire.

Some changes may be made in the construction and arrangement of my improved under-inflated tire warning device without departing from the real spirit and purpose of my invention, and it is my intention to cover by my claims any modified forms of structure or use of mechanical equivalents which may be reasonably included within their scope.

I claim:

1. In combination with a wheel rim and pneumatic tire therein, a warning device comprising, a spring member capable of making a clicking sound when flexed, a bracket having one end detachably secured to the rim of said wheel and its other end rigidly secured to one end of said spring member; said spring member extending radially outwardly from said wheel rim and adjacent a portion of the side wall of said tire, and a housing loosely embracing all of said spring member hinged to said bracket in one of its end portions and having one of its sides extending between said spring member and the side wall of said pneumatic tire; said housing extending radially outwardly from said rim and capable of being engaged by the side wall of said tire near its free end at times and thereby move to engage and flex said spring.

2. In combination with a wheel rim and pneumatic tire therein, a warning device comprising, a spring member capable of making a clicking sound when flexed, a bracket having one end secured to the rim of said wheel and its other end rigidly secured to one end of said spring member; said spring member extending radially outwardly from said wheel rim and adjacent a portion of the side wall of said tire, and a housing loosely embracing said spring member hinged to said bracket in one of its end portions and having one of its sides extending between said spring member and the side wall of said pneumatic tire; said housing extending radially outwardly from said rim and capable of being engaged by the side wall of said tire near its free end at times and thereby move to engage and flex said spring.

WILLIAM E. McCULLOCH.